US012587257B2

(12) United States Patent
Säily et al.

(10) Patent No.: US 12,587,257 B2
(45) Date of Patent: Mar. 24, 2026

(54) BEAM MANAGEMENT IN CELLULAR SYSTEM

(71) Applicant: Nokia Technologies Oy, Espoo (FI)

(72) Inventors: Mikko Säily, Espoo (FI); Pavel Bilkis, Espoo (FI); Risto Ilari Wichman, Helsinki (FI); Mehmet Cagri Ilter, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 81 days.

(21) Appl. No.: 18/688,765

(22) PCT Filed: May 5, 2022

(86) PCT No.: PCT/EP2022/062167
§ 371 (c)(1),
(2) Date: Mar. 2, 2024

(87) PCT Pub. No.: WO2023/030702
PCT Pub. Date: Mar. 9, 2023

(65) Prior Publication Data
US 2024/0388351 A1      Nov. 21, 2024

(30) Foreign Application Priority Data
Sep. 2, 2021    (FI) ...................................... 20215922

(51) Int. Cl.
H04L 23/02        (2006.01)
H04B 7/06        (2006.01)
H04B 7/08        (2006.01)

(52) U.S. Cl.
CPC ......... *H04B 7/06952* (2023.05); *H04B 7/088* (2013.01)

(58) Field of Classification Search
CPC ...... H04B 7/088; H04B 17/24; H04B 7/0695; H04B 7/06952; H04W 72/085; H04W 36/08; H04W 92/18; H04W 72/27; H04W 72/546; H04L 5/0055; H04L 43/065
USPC ........................................................ 375/262
See application file for complete search history.

(56) References Cited

U.S. PATENT DOCUMENTS

| | | | |
|---|---|---|---|
| 2019/0045569 A1* | 2/2019 | Abedini ................ | H04W 16/28 |
| 2021/0084441 A1* | 3/2021 | Zhou ..................... | H04W 72/21 |
| 2021/0100061 A1* | 4/2021 | Park ...................... | H04W 76/25 |
| 2021/0352625 A1* | 11/2021 | Akkarakaran ........ | H04W 72/20 |
| 2022/0385349 A1* | 12/2022 | Wang .................... | H04B 7/088 |
| 2024/0195482 A1* | 6/2024 | Zhang ................... | H04B 7/088 |

* cited by examiner

*Primary Examiner* — Khai Tran
(74) *Attorney, Agent, or Firm* — Carter, DeLuca & Farrell LLP

(57)              ABSTRACT

This document discloses a solution for facilitated beam management procedure. According to an aspect, a method comprises in an apparatus: receiving, directly from a terminal device over a sidelink between the apparatus and the terminal device, a beam measurement report, the beam measurement report indicating at least one beam of a plurality of directive beams transmitted by an access node; using the beam measurement report to select a beam amongst the at least one beam; and communicating with the access node in communication resources of the selected beam.

2 Claims, 6 Drawing Sheets

BEAM MANAGEMENT IN CELLULAR SYSTEM

RELATED APPLICATION

This application was originally filed as PCT Application No. PCT/EP2022/062167, filed on May 5, 2022, which claims priority from FI application No. 20215922, filed on Sep. 2, 2021, each of which is incorporated herein by reference in its entirety.

FIELD

Various embodiments described herein relate to the field of wireless communications and, particularly, to beam management and facilitating beam selection in a terminal device.

BACKGROUND

Access nodes (gNB, eNB, base station etc.) of modern cellular communication system employ a series of directive beams to provide coverage in a cell. This distinguishes from conventional omnidirectional beams, and the purpose is to get benefits of beamforming gain and to combat signal attenuation that is relatively high on higher communication frequencies. An access node may transmit the series of directive beams in a sweeping manner such that each beam is transmitted at a distinct time instant. In this manner, the access node is capable of directing all of its transmission power to a specific part (covered by a beam of the series of directive beams) of the cell at a particular time. Each beam may be provided a dedicated identifier so that terminal devices are capable of distinguishing the different beams. Each beam may also have dedicated random access resources (e.g. preambles). A terminal device intending to communicate with the access node may perform measurements to measure beams that it is capable of detecting and select a beam providing a sufficient quality. Then, the terminal device may select the respective random access resources and contact the access node at the selected beam in a random access procedure.

Such measurement of multiple beams may, however, consume resources of the terminal device. For example, there is an on-going development of low-complexity and low-power terminal devices that have limited functions and capabilities.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising means for performing: receiving, directly from a terminal device over a sidelink between the apparatus and the terminal device, a beam measurement report, the beam measurement report indicating at least one beam of a plurality of directive beams transmitted by an access node; using the beam measurement report to select a beam amongst the at least one beam; and communicating with the access node in communication resources of the selected beam.

In an embodiment, the beam measurement report further indicates a quality of each beam indicated in the beam measurement repots, and wherein the means are configured to select a beam having the highest quality.

In an embodiment, the means are configured to receive a further beam measurement report from a further terminal device, the further beam measurement report indicating at least one beam of the plurality of directive beams transmitted by the access node, the at least one beam comprising at least one same beam indicated in said beam measurement report received from the terminal device, and to select a beam indicated in both received measurement reports.

In an embodiment, the means are configured to receive a further a beam measurement report from a further terminal device, the further beam measurement report indicating at least one beam of the plurality of directive beams transmitted by the access node, to determine proximity of the terminal device and the further terminal device with respect to the apparatus, and to select the beam if the terminal device is determined to be closer to the apparatus than the further terminal device.

In an embodiment, the means are configured to select the beam in an idle or inactive state of the apparatus.

In an embodiment, the means are configured to select the beam in a connected state of the apparatus where the apparatus is experiencing a radio link failure with the access node.

In an embodiment, the beam measurement report comprises an identifier of each of the at least one beam, and wherein the means are configured to use the identifier of the selected beam when communicating with the access node.

According to an aspect, there is provided an apparatus comprising means for performing: measuring a plurality of directive beams received from an access node; selecting a beam amongst the measured plurality of directive beams and communicating with the access node over the selected beam; generating a beam measurement report indicating at least the selected beam; and transmitting the beam measurement report directly to at least one terminal device over a sidelink between the apparatus and the at least one terminal device, thereby facilitating a beam management procedure of the at least one terminal device.

In an embodiment, the means are configured to measure a quality of the plurality of directive beams and to add to the beam measurement report the measured quality of each beam indicated in the beam measurement report.

In an embodiment, the means are further configured to add to the beam measurement report an identifier of each beam indicated in the beam measurement report.

In an embodiment, the means comprises at least one processor and at least one memory including computer program code, wherein the at least one memory and computer program code are configured, with the at least one processor, to cause the performance of the apparatus.

According to an aspect, there is provided a method comprising: receiving, by a first terminal device directly from a second terminal device over a sidelink between the first terminal device and the second terminal device, a beam measurement report, the beam measurement report indicating at least one beam of a plurality of directive beams transmitted by an access node; using, by the first terminal device, the beam measurement report to select a beam amongst the at least one beam; and communicating, by the first terminal device, with the access node in communication resources of the selected beam.

In an embodiment, the beam measurement report further indicates a quality of each beam indicated in the beam measurement repots, and wherein the first terminal device selects a beam having the highest quality.

In an embodiment, the first terminal device receives a further beam measurement report from a third terminal device, the further beam measurement report indicating at least one beam of the plurality of directive beams transmitted by the access node, the at least one beam comprising at least one same beam indicated in said beam measurement report received from the second terminal device, and selects a beam indicated in both received measurement reports.

In an embodiment, the first terminal device receives a further a beam measurement report from a third terminal device, the further beam measurement report indicating at least one beam of the plurality of directive beams transmitted by the access node, determines proximity of the second terminal device and the third terminal device with respect to the first terminal device, and selects the beam if the second terminal device is determined to be closer to the first terminal device than the third terminal device.

In an embodiment, the first terminal device selects the beam in an idle or inactive state of the first terminal device.

In an embodiment, the first terminal device selects the beam in a connected state of the first terminal device where the first terminal device is experiencing a radio link failure with the access node.

In an embodiment, the beam measurement report comprises an identifier of each of the at least one beam, and wherein the first terminal device uses the identifier of the selected beam when communicating with the access node.

According to an aspect, there is provided a method comprising: measuring, by a terminal device, a plurality of directive beams received from an access node; selecting, by the terminal device, a beam amongst the measured plurality of directive beams and communicating with the access node over the selected beam; generating, by the terminal device, a beam measurement report indicating at least the selected beam; and transmitting, by the terminal device, the beam measurement report directly to at least one other terminal device over a sidelink between the terminal device and the at least one other terminal device, thereby facilitating a beam management procedure of the at least one other terminal device.

In an embodiment, the terminal device measures a quality of the plurality of directive beams and adds to the beam measurement report the measured quality of each beam indicated in the beam measurement report.

In an embodiment, the terminal device adds to the beam measurement report an identifier of each beam indicated in the beam measurement report.

According to an aspect, there is provided a computer program comprising instructions which, when the program is executed by an apparatus, cause the apparatus to carry out: receiving, directly from a second terminal device over a sidelink between the first terminal device and the second terminal device, a beam measurement report, the beam measurement report indicating at least one beam of a plurality of directive beams transmitted by an access node; using the beam measurement report to select a beam amongst the at least one beam; and communicating with the access node in communication resources of the selected beam.

According to an aspect, there is provided a computer program comprising instructions which, when the program is executed by an apparatus, cause the apparatus to carry out: measuring a plurality of directive beams received from an access node; selecting a beam amongst the measured plurality of directive beams and communicating with the access node over the selected beam; generating a beam measurement report indicating at least the selected beam; and transmitting the beam measurement report directly to at least one other terminal device over a sidelink between the terminal device and the at least one other terminal device, thereby facilitating a beam management procedure of the at least one other terminal device.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figures 1, 2:
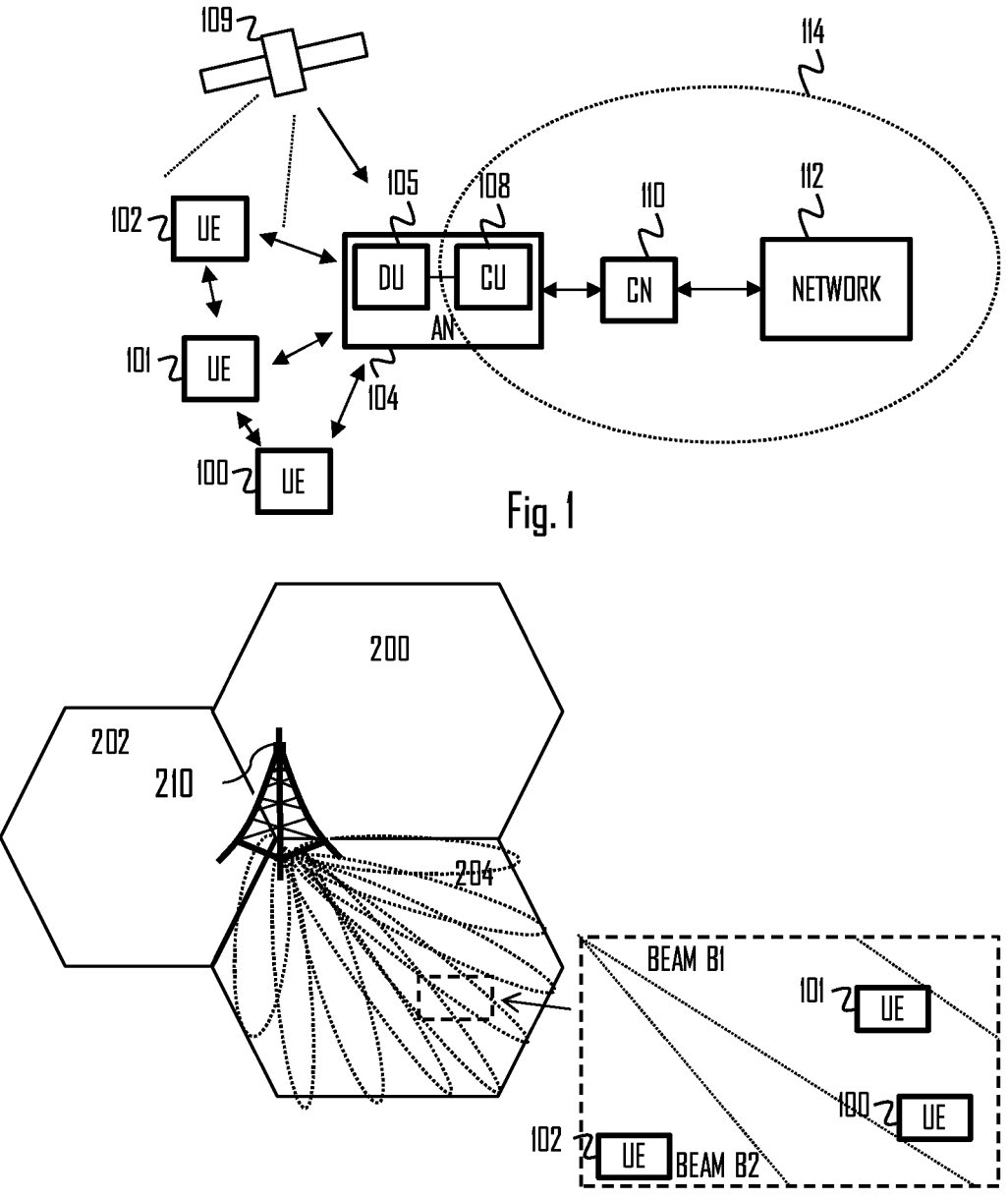
FIG. 2 illustrates a situation to which some embodiments described herein can be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100, 101, and 102 configured to be in a wireless connection on one or more communication channels in a cell with an access node AN (such as (e/g)NodeB) 104 providing the cell. (e/g) NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signaling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to a core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called user equipment UE, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications define two relay modes: out-of-band relay where same or different carriers may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities 109 that create on-ground cells. The on-ground cells may be created through an on-ground relay node or by a gNB located on-ground or in a satellite 109.

6G architecture is targeted to enable easy integration of everything, e.g. a network of networks, joint communication and sensing, non-terrestrial networks and terrestrial communication. 6G systems encompass machine learning algorithms as well as local and distributed computing capabilities, where virtualized network functions can be distributed over core and edge computing resources. Far edge computing, where computing resources are pushed to the very edge of the network, will be part of the distributed computing environment, for example in "zero-delay" scenarios. 5G systems may also employ such capabilities. More generally, the actual (radio) communication system is envisaged to be comprised of one or more computer programs executed within a programmable infrastructure, such as general purpose computing entities (servers, processors, and like).

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto-or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

Modern cellular systems have also introduced a sidelink air interface concept that is in some literature called device-to-device (D2D), machine-to-machine (M2M), or machine-type communications. In such a concept, terminal devices employ time-frequency resources of the access node to conduct direct device-to-device communications that are exchanged directly between the terminal devices without a need to route the communications via the access node. This removes at least one hop from the logical communication link. These sidelink proximity services may be utilized in various scenarios ranging from direct automotive communication between vehicles (vehicle-to-vehicle, vehicle-to-everything, cellular vehicle-to-everything) to industrial automation with ultra-reliable-low-latency communication (URLLC) for mission- and business-critical applications. Sidelink connections can also be used for enhancing consumer communication experience in gaming and entertainment services with augmented reality/virtual reality/mixed reality by replacing Bluetooth or Wi-Fi links, for example. Sidelink air interface may also be used in multi-hop relaying to provide coverage extension. The sidelink services may equally include services that relate to the management of connectivity with the access node. Some such embodiments are described below.

As described in Background, an access node of a modern cellular systems such as the 5G system provides coverage in a cell by using a grid of highly directive radio beams that together cover the cell. A single beam provides coverage only in a sub-area of the cell that is a fraction of the coverage area of the cell. The access node may enable and disable beams in an alternating manner, thus being capable of reaching better directivity and greater beamforming gain in a particular area in the cell. At a particular time instant, only one of the beams of the grid may be enabled while the other beams are disabled, and in this manner the access node may sweep through all the beams. FIG. 2 illustrates a simplified example of the beam sweeping and the beam grid. In this example, the terminal devices 100 and 101 are within a coverage area of one beam B1 while the terminal device 102 is in a coverage area of another beam B2. Some embodiments described below are directed to this scenario.

Each beam may have a distinct identifier that distinguishes each beam from the other beams of the access node. Accordingly, the terminal devices are also capable of distinguishing the different beams and to select a beam via which o communicate with the access node. A beam management procedure comprises the access node performing a beam sweeping where the access node transmits a synchronization signal block (SSB) of each beam at a time. A terminal device measures the beam or beams it is capable of detecting. The measurement may comprise measuring a reference signal received power (RSRP), a reference signal received quality (RSRQ), a received signal strength indicator (RSSI), a signal-to-noise ratio (SNR), or another signal power or quality metric that indicates reception quality of each measured beam. The measurement may comprise also measuring the sidelink channel occupancy ratio (SL CR) and sidelink channel busy ratio (SL CBR) and the terminal device 100 may use this information to select a low occupancy beam. Upon measuring the quality of the detected beams, the terminal device can then select the beam best capable of providing the terminal device with access to the access node. The access node may transmit system information in each beam, the system information indicating, for example, beam-specific random access resources, e.g. one or more random access preambles per beam. The terminal device may then use the random access resources of the selected beam and start a random access procedure with the access node in the selected random access resources. Such a procedure is called beam management procedure in the literature. The beam management procedure may be carried out when the terminal device is in a low activity mode (e.g. idle or inactive mode) and searching for an access node to access, or when the terminal device is performing a beam reselection in a connected mode with the access node. The idle mode, inactive mode and the connected mode may refer to respective radio resource control (RRC) connection idle, inactive and connected modes in 3GPP specifications.

Figures 3, 4:
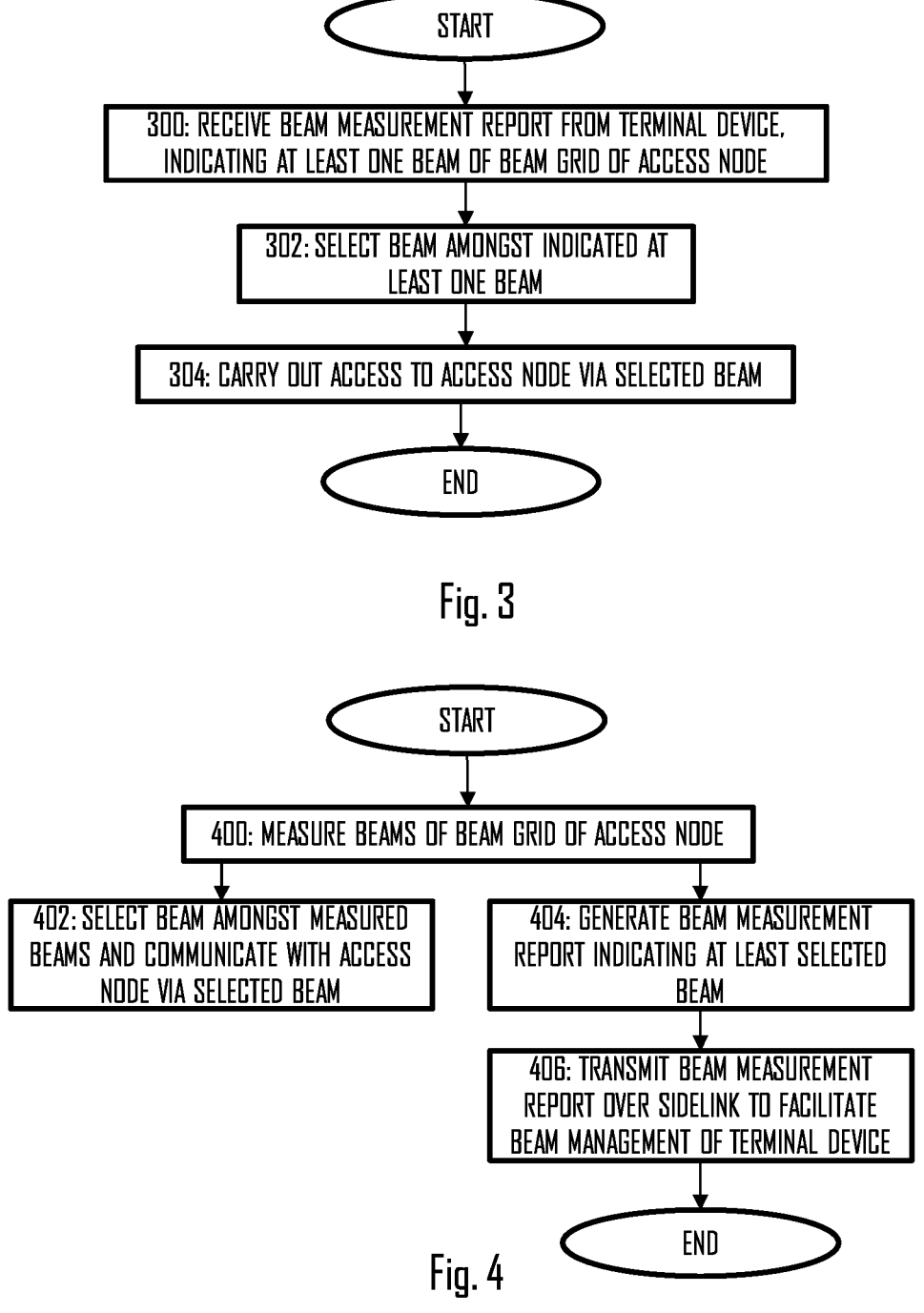
FIGS. 3 and 4 illustrate flow diagrams of processes for carrying out facilitated beam management procedure according to some embodiments.

As described above, the measurements may be made with respect to multiple beams and the measurements and associated signal processing consumes the hardware, power, and signal processing resources of a terminal device. It may be advantageous particularly for low-complexity terminal devices to simplify the beam management procedure. For example, finding the suitable beam may be a complex procedure particularly on higher frequency ranges (millimetre waves) where the directional beams are very narrow. FIGS. 3 and 4 illustrate embodiment of such a procedure for the terminal devices, e.g. the terminal devices 100 to 102 in the context of FIG. 2. FIG. 3 illustrates a beam management procedure for such a low-complexity terminal device, for example the terminal device 100, while FIG. 4 illustrates a procedure for a terminal device facilitating a beam management procedure of such a low-complexity terminal device, e.g. the terminal device 101 or 102. While the low-complexity terminal device 100 is used in this example, the terminal device may be a 'conventional' terminal device that exploits the availability of the facilitated beam management procedure provided by the terminal device(s) 101, 102.

Referring to FIG. 3, the procedure for communication in an apparatus such as the terminal device 100 comprises: receiving (block 300) a beam measurement report from a terminal device 101, 102, the beam measurement report indicating at least one beam of a plurality of directive beams transmitted by an access node 104; selecting (block 302) a beam amongst the at least one beam; and accessing (block 304) the access node by using the selected beam.

The beam measurement report may be received by the apparatus directly from the terminal device 101, 102 over a sidelink between the apparatus and the terminal device.

Referring to FIG. 4, the procedure for an apparatus for the facilitating terminal device 101, 102 comprises: measuring (block 400) a plurality of directive beams received from an access node 104; selecting (block 402) a beam amongst the measured plurality of directive beams and communicating with the access node over the selected beam; generating (block 404) a beam measurement report indicating at least the selected beam; and transmitting (block 406) the beam measurement report over a sidelink.

As described above, the sidelink services are proximity services shared by the terminal devices that are within close proximity of one another. Therefore, the terminal devices within the close proximity of one another may experience substantial similar conditions for the beam management procedure. This feature is exploited in the embodiments of FIGS. 3 and 4 so that a terminal device 101, 102 that has carried out a beam management procedure will share the information on the beam management procedure over the sidelink. Another terminal device 100 about to carry out the beam management procedure may then choose to benefit of the information contained in the beam measurement report received in block 300. An advantage of such a procedure is simplified beam management procedure in the terminal device 100, resulting in reduced complexity and power consumption in the terminal device 100. Another advantage is faster beam management procedure because the terminal device needs not to wait for measurement of multiple beams.

In an embodiment, the beam measurement report indicates the beam selected by the terminal device 101, 102 in block 402 to access the access node. In an embodiment, the beam measurement report indicates only the beam selected by the terminal device 101, 102 in block 402 to access the access node. In these embodiments, the terminal device 100 acquires information of the beam(s) selected by the other terminal devices 101, 102 in the proximity of the terminal device 100. The terminal device 100 may use this information directly to select the indicated beam in block 302 and access the access node in block 304. Further logic may be built on top of this idea. For example, if at least N terminal devices in the proximity indicate the same beam, the terminal device 100 selects the respective beam, wherein N is a determined number greater than or equal to two.

In an embodiment, the sidelink refers to the above-described sidelink concept where the terminal devices communicate directly with one another in resources of a cell managed by the access node.

In an embodiment, the sidelink resource allocation mode can be mode 1 where the sidelink resource allocation is provided by the network and mode 2 where the terminal device decides the sidelink transmission resources in the sidelink resource pool. In mode, 2 the terminal device may autonomously select sidelink resources from one or more resource pools given by the access node system information, via dedicated signaling while inside access node coverage, or by pre-configuration while outside of access node coverage.

In an embodiment, the terminal devices 101, 102 transmit the beam measurement report as a unicast, groupcast, multicast, or a broadcast over the sidelink. Unicast transmission can be understood as connection between peer terminal devices forming a pair for transmission and reception of said control information or user traffic between peer terminal devices in sidelink. As known in the art, unicast is a one-to-one transmission. Groupcast transmission can be understood as transmission and reception of user traffic or control information or user data traffic among terminal devices belonging to a group in sidelink. Multicast transmission can be understood as transmission and reception of the control information or user data traffic from one transmitter to multiple receivers that may or may not belong to the same logical group. Broadcast transmission can be understood as transmission and reception of user traffic or control information or user adata traffic among terminal devices in sidelink without explicitly specifying a receiver. Broadcast, groupcast, and multicast transmissions can be considered as one-to-many transmission. In an embodiment, the terminal devices 101, 102 transmit the beam measurement with a smaller transmit power than some other sidelink transmissions. The point of the beam measurement report is that only terminal devices that are probably located under the coverage area of the same beam detect the beam measurement report. The transmit power may be designed according to the beam width of the beams transmitted by the access node, or some default parameter value derived from an average beam width.

Figure 5:
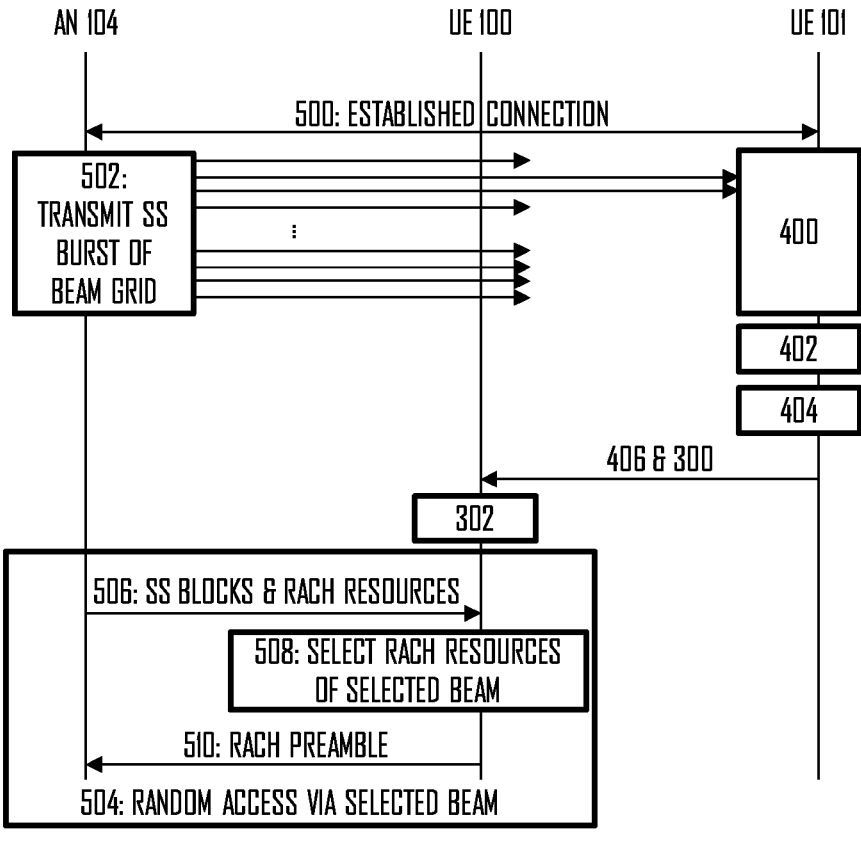
FIG. 5 illustrates a signaling diagram combining the processes of FIGS. 3 and 4 according to an embodiment.

FIG. 5 illustrates a procedure that combines the processes of FIGS. 3 and 4. In this case, let us assume that only the terminal device 101 transmits the beam measurement report. Referring to FIG. 5, the initial state may be such that the terminal device 101 is connected to the access node (step 500) while the terminal device 100 is in an idle state with respect to the access node 104. The situation may be such that the terminal device 100 has just entered the coverage area of the access node 104 or is about to start accessing the access node 104. Alternatively, the terminal device 100 may have experienced a radio link failure with the access node and lost a connection with the access node. In such a case, the terminal device 100 may be attempting to re-establish the connection. FIG. 5 can also understood to substantially represent the relevant steps in a procedure where the terminal device 101 is connected to the access node (step 500)

while the terminal device 100 is in an inactive state with respect to the access node 104 after cell reselection to the access node 104.

In step 502, the access node transmits a burst of synchronization signals in the beams of the beam grid in a cell to allow the beam measurements by the terminal devices. The access node may transmit the burst periodically with a determined periodicity. As indicated in FIG. 2, a terminal device at a particular location in the cell may be capable of detecting and measuring only some beams of the beam grid. The terminal device 101 measures the detected beams in block 400, a described above, and performs the beam selection in block 402. Further, the terminal device 101 generates the beam measurement report indicating at least the selected beam in block 404, and transmits the beam measurement report over the sidelink in step 406. The terminal device 100 then receives the beam measurement report in step 300 and selects a beam amongst the beam(s) indicated in the beam measurement report (block 302). Thereafter, the terminal device 100 accesses the access node in a random access procedure 504 associated with the selected beam. Upon selecting the beam, the terminal device may start monitoring for system information of the selected beam. For the identification of the beam, the beam measurement report may indicate a time index of the synchronization signal of the beam(s) in the beam measurement report. The time index indicates a timing of the beam and, accordingly, the terminal device may be capable of monitoring for the next transmission of the selected beam.

The access node may transmit, in step 506 as the system information, random access resources of the beam. As described above, the random access resources may comprise one or more random access preambles dedicated to the beam. As a consequence, upon receiving the system information, the terminal device acquires the random access preamble(s) and selects one of the preamble(s) in block 508. In step 510, the terminal device transmits the preamble to the access node and the random access procedure may proceed in a conventional manner with the access node responding to the terminal device with a random access response.

Figure 6:
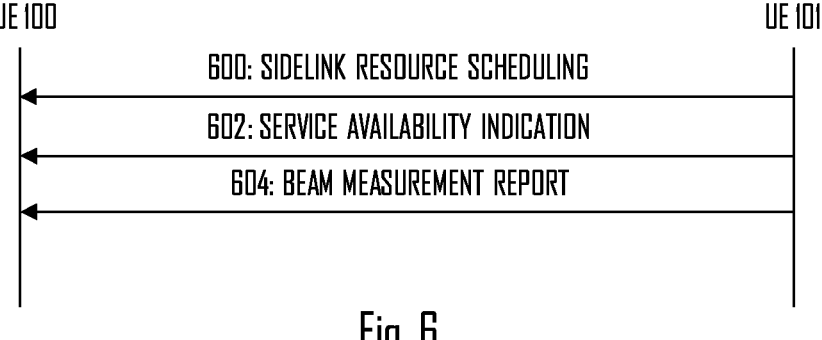
FIG. 6 illustrates an embodiment for performing sidelink communications.

FIG. 6 illustrates an embodiment of the procedure for transmitting the beam measurement report over the sidelink. As known in the literature, there are several mechanisms to claim sidelink resources to transmit data and/or signaling information. The terminal device 101 about to transmit the beam measurement report may first scan the sidelink communication resources for a free time-frequency resource. Upon detecting and selecting the sidelink communication resources, the terminal device 101 may transmit sidelink control information in step 600 to indicate its claim to the sidelink communication resources. Said control information may be transmitted over physical sidelink broadcast channel (PSBCH) or physical sidelink control channel (PSCCH). Sidelink control information may be transmitted in two stages. The first stage sidelink control information is carried on PSCCH and contains information to enable sensing operations and carry information about the resource allocation of the physical sidelink shared channel (PSSCH). PSSCH transmits the second stage sidelink control information. The second stage sidelink control information carries information needed to identify and decode the associated sidelink shared channel (SL-SCH). This signal may include a synchronization signal enabling the terminal device 100 to synchronize to the terminal device 101 and acquire the information on the resource claim. Sidelink synchronization signals convey synchronization information in the sidelink primary synchronization signal and sidelink secondary synchronization signal forming the PSBCH and the sidelink synchronization signal block. It may also include at least one information element for indicating a modulation and coding scheme for the following transmission(s) and, optionally, other information needed for decoding the following PSSCH transmission(s). It may also include information on the transmitting terminal device, such as a location of the terminal device. The location may be included in the beam measurement report in an alternative embodiment. The terminal device 101 may employ frequency range 1 (sub-6 GHZ) sidelink communication resources, as it enables device-to-device (D2D) communication without establishing any D2D-specific beams. This simplifies the sidelink transmissions.

Figure 7:
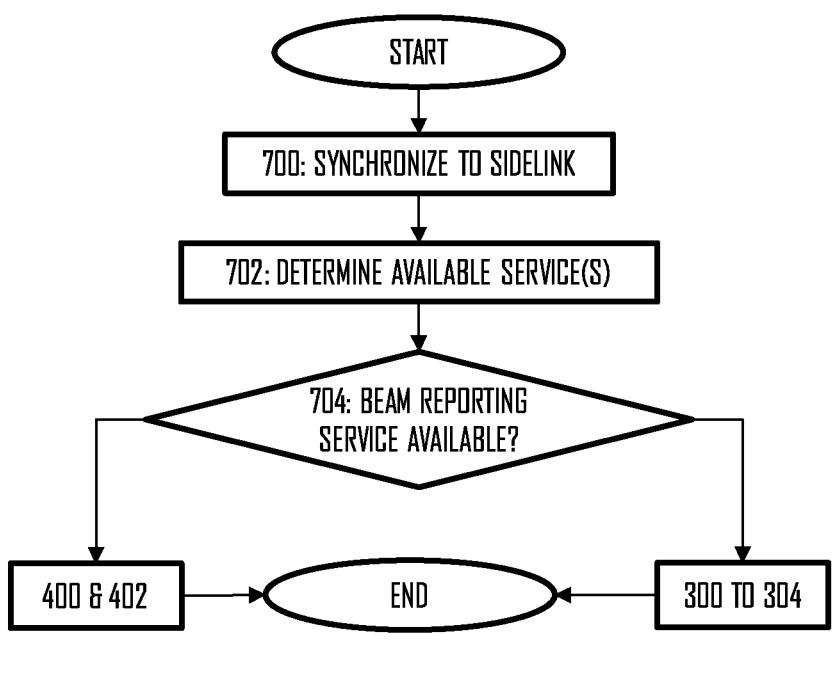
FIG. 7 illustrates a procedure for selecting a beam selection procedure in a terminal device according to an embodiment.

An alternative to the terminal device 101 autonomously claiming the sidelink communication resources is that the access node schedules the sidelink communication resources to the terminal device 101 in response to the terminal device 101 transmitting a sidelink scheduling request to the access node together with a buffer status report. Thereafter, the terminal device 101 may transmit second-stage signaling information comprising a service availability indication in step 602. This information may indicate that the terminal device 101 provides the service of transmitting the beam measurement reports. Upon detecting the service availability indication and upon determining to employ the facilitated beam management procedure, the terminal device 100 may choose to benefit from the service and wait for the subsequent beam measurement report from the terminal device 101. The beam measurement report is then sent (unicast, groupcast, multicast or broadcast) by the terminal device 101, and the terminal device 100 receives the beam measurement report and proceeds to block 302. FIG. 7 illustrates a detailed procedure for the terminal device in this context. Referring to FIG. 7, the terminal device 100 may scan for the sidelink communication resources for sidelink transmissions. Upon detecting a transmission, the terminal device 100 may synchronize to a synchronization signal of the transmission in block 700. An alternative method for synchronization is to acquire the clock from a global navigation satellite system (GNSS) or from a synchronization signal burst of the access node 104. Upon receiving the sidelink control information in the same transmission or in a subsequent transmission, the terminal device 100 gains information on the available sidelink service(s) in block 702. In the situation of searching for the facilitated beam management procedure, the terminal device 100 may carry out block 704 where the terminal device 100 determines whether or not the respective beam measurement reporting service is amongst the available sidelink service(s). If the service is available, the terminal device may proceed to carry out blocks 300 to 304 in the above-described manner. In case the service is not available, the terminal device may choose to perform a conventional beam management procedure where it measures the beams transmitted by the access node and thereafter performs the beam selection on the basis of its own measurements (blocks 400 and 402). In this manner, even the terminal devices 101, 102 with the capability of performing the beam measurements may choose to benefit from the available beam measurement reporting service and, thus, gain the benefits of faster beam management and power savings.

In an embodiment, the terminal device 101, 102 transmits the beam measurement reports periodically with a determined periodicity. The periodicity may be at least the same as the periodicity of the transmission of the bursts by the access node.

In an embodiment, the terminal device 101, 102 performing the process of FIG. 4 transmit a beam measurement report to the access node 104 in order to indicate at least the best-quality beams. The beam measurement report transmitted by the terminal devices 101, 102 over the sidelink may contain the same beam measurement information as the beam measurement report sent to the access node.

In an embodiment, the beam measurement report further indicates a quality of each beam indicated in the beam measurement repots. The terminal device 100 may then select a beam having the highest quality in the received beam measurement report.

In an embodiment, the beam measurement report further indicates an associated service of each beam indicated in the beam measurement repots. The terminal device 100 may then select a beam having the suitable service in the received beam measurement report. Such services may include voice services, mission critical applications, public safety applications, ultra-reliable low latency communications (URLLC), mobile broadband (MBB), machine type communications (MTC), sensor networking, internet of things networking, automotive and vehicle to everything (V2X) communications, for example.

In an embodiment, terminal device 100 may declare a beam failure on beam B1. After beam failure is declared, terminal device 100 may request to unicast, groupcast, multicast or broadcast the beam measurement report as sidelink control information a beam measurement report from terminal device 101, 102 to terminal device 100.

Below, an embodiment of a format of the beam measurement report is provided. Some information elements may be optional, as described herein.

| Byte # | 0 | 1 | ... | $N_{format}$ | 0 | ... | $N_{ssb\text{-}index}$ | 0 | ... | $N_{rsrp}$ |
|---|---|---|---|---|---|---|---|---|---|---|
| Data | | Format indication bits (for different data representation) | | | | SSB time index bits (beam identification) | | | RSRP bits (beam measurement) | |

In the table above, $N_{format}$ indicates the number of bytes reserved for the format indication bits that indicate the format of the beam measurement report, and respective data bytes indicate the format. As described above, some information elements may be optional, and the format may indicate the information elements provided in the beam measurement report. Further, the beam measurement report may include at least one information element indicating the at least one beam measured by the terminal device 101, 102 transmitting the beam measurement report. The at least one information element indicating the at least one beam may comprise an identifier of the respective at least one beam. The identifier may be a time index of the synchronization signal block (SSB) of the respective beam, or another identifier. $N_{ssb\text{-}index}$ may define the number of bits allocated to the identifier. The at least one information element indicating the at least one beam may further comprise an information element indicating the measured quality of the identified beam. As described above, a metric measured by the terminal device 101, 102 and comprised in this information element may be the RSRP, SNR, or another signal quality metric. $N_{rsrp}$ may indicate the number of bytes allocated to the signal quality metric in the beam measurement report The table above indicates the identifier and the quality metric for one indicated beam, but respective information elements may be provided for a plurality of measured beams, and the format indication bits may be used to define the number of indicated beams in terms of the number of different beam identifier—quality metric pairs in the beam measurement report. Accordingly, the terminal device 101, 102 may measure a quality of the plurality of directive beams and to add to the beam measurement report the measured quality of each beam indicated in the beam measurement report. The terminal device 101, 102 needs not to include in the beam measurement report all the measured beams but, for example, add to the beam measurement report beams measured to provide a quality above a threshold and exclude from the beam measurement report at least one beam measured to provide a quality below the threshold.

As described, an embodiment of the beam measurement report has the following format. In the simplest form, the beam measurement report may have an identifier of only one beam, and even that without the measured quality metric.

| Byte # | 0 | 1 | ... | $N_{format}$ | 0 | ... | $N_{ssb-index}$ |
|---|---|---|---|---|---|---|---|
| Data | | Format indication bits (for different data representation) | | | | SSB time index bits (beam identification) | |

As described above, the terminal device 100 may use the identifier of the selected beam when accessing the access node. For example, if the identifier is the SSB time index, the terminal device may monitor for the SSB and the respective system information from the access node in a time-frequency resource indicated by the SSB time index, receive the random access resources in the system information in the time-frequency resource, and use the random access resources in the random access procedure described above.

Figure 8:
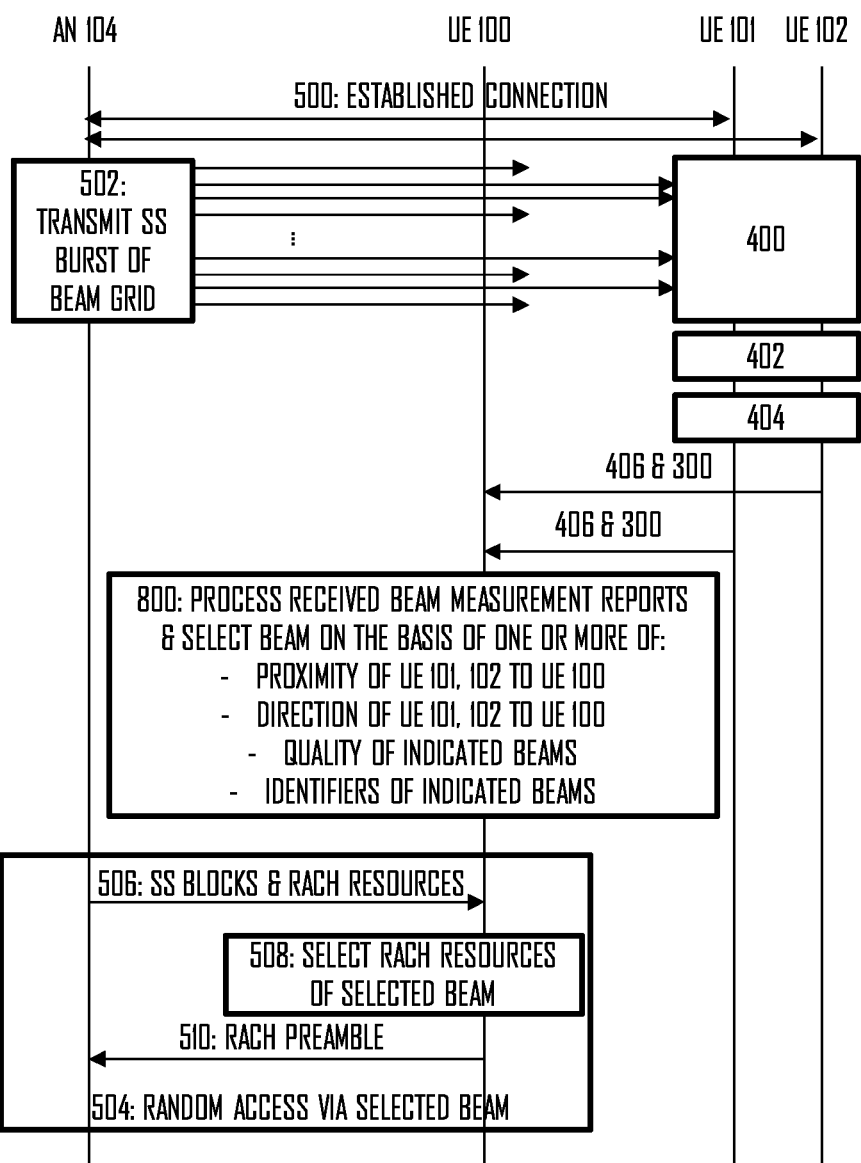
FIG. 8 illustrates a signaling diagram of an embodiment where a terminal device receives beam measurement reports from multiple proximal terminal devices.

Let us then describe some embodiments that relate to the terminal device 100 receiving beam measurement reports from multiple terminal devices 101 and 102. FIG. 8 illustrates a signaling diagram of such an embodiment that is a modification of FIG. 5. Accordingly, the steps denoted by the same reference numbers as in the other Figures represent the same or substantially similar operations and functions.

Both terminal devices 101 and 102 may carry out the process of FIG. 4 and transmit the respective beam measurement reports over the sidelink, e.g. as unicast, the groupcasts, the multicasts or the broadcasts. Since the locations of the terminal devices 101, 102 are different, they may measure different qualities of the beam grid, and include in the respective beam measurement reports at least partially different set of beams. The terminal device 100 may collect the beam measurement reports for a determined time interval, e.g. duration of a SSB burst in case the periodicity of the SSB bursts is used as a default also for the periodicity of beam measurement reports. Upon receiving the multiple beam measurement reports from the terminal devices 101, 102, the terminal device 100 may then process the received beam measurement reports and select one of the indicated beams in block 800. Below, some embodiments of such processing are described.

In an embodiment where both beam measurement reports indicate the same beam, e.g. without the respective quality metrics, the terminal device may select the beam indicated in both beam measurement reports. In case of a greater number of reporting terminal devices, the terminal device 100 may carry out a more complex procedure. For example, the terminal device 100 may select a beam indicated by the greatest number of reporting terminal devices. In this case, the indication in the beam measurement report may indicate the beam selected by the respective reporting terminal device. Accordingly, the terminal device may select a beam selected also by the greatest number of reporting terminal devices.

In an embodiment where the quality metrics are also provided in the beam measurement reports, the reported quality metrics may be taken into account. For example, the terminal device may select a beam indicated in both reports and indicating quality above a determined threshold in both reports. In an embodiment, the terminal device 100 sorts the reported beams in the order of decreasing reported quality metric and selects one or more beams first in the sorted list. In the most simplified form, the first beam in the list is selected. In another embodiment, further information such as the location or direction of the terminal device 101, 102 is used in the selection, as described below.

In an embodiment, the proximity and/or direction of the terminal devices 101, 102 with respect to the terminal device 100 are used in the beam selection in block 800. In case the terminal device 100 has an antenna array and associated signal processing capabilities to analyze an angle-of-arrival of received beam measurement reports, this information may be used in the selection. For example, if the terminal devices 101, 102 are detected to be to substantially opposite directions from the terminal device and they both indicate the same beam as a selected beam or a beam providing signal quality above the threshold, the terminal device may select such a beam. The logic is that the terminal device 100 may safely determine that it is between the terminal devices 101, 102 that all are served by the same beam. In case both terminal devices 101, 102 are estimated to be located to substantially the same direction with respect to the terminal device 100, the terminal device may use location or proximity information as further input, if available. As described above, the beam measurement reports may report the location of the reporting terminal device, or the location information may be provided in the sidelink control information, as described above. Alternatively, the terminal device 100 may measure a received signal strength indicator of a reference signal received from the reporting terminal device and perform path loss estimation or a similar signal processing estimation based on the received signal strength indicator to measure distance between the terminal device and the respective reporting terminal device. The distance may then be used in the selection. For example, the terminal device 100 may select the beam selected also the reporting terminal device closest to the terminal device 100. On the other hand, if two reporting terminal devices are to the same direction from the terminal device 100 and indicate preference of different beams, the terminal device 100 may employ the beam measurement report of the reporting terminal device closest to the terminal device 100. Other embodiments can be foreseen that give a higher weight to the beam measurement reports received from the reporting terminal device(s) closest to the terminal device 100.

In an embodiment, other characteristics are used as criteria in the beam selection. For example, the terminal device 100 may form a group with the terminal device 101 or 102 and use the grouping as a basis for the beam selection. For example, if the terminal device 100 is grouped with the terminal device 101 and not with the terminal device 102 and receives the beam measurement report from both terminal devices 101, 102, the terminal device may prioritize the beam measurement report of the terminal device 101 over the beam measurement report of the terminal device 102. For example, the prioritization may result in selecting the same beam selected by the terminal device 101 in the same group.

A common service may be another criterion for the beam selection. The terminal devices 100, 101 may discover the service(s) of one another during the establishment of the sidelink. Accordingly, the terminal device 100 discovers one or more communication services of the access node used by the terminal device 101. If the terminal device 100 determines to use the same service in communication with the access node, the terminal device may select the same beam selected by the terminal device 101, as indicated in the beam measurement report. A logic may be that a certain beam of the access node may be dedicated to provide a certain service or that the certain beam may be provide the certain service with a better quality than another beam. Accordingly, the information on the common service may be used in the selection to select a suitable beam for the service.

In an embodiment, the terminal device 100 may select a beam to perform beam failure recovery towards the access node based on the beam measurement report received as the sidelink control information from terminal device 101, 102. If the access node or terminal device 101, 102 has provided dedicated random access resources for certain beams, those may be used by the terminal device 100 in the beam failure recovery.

Figures 9, 10:
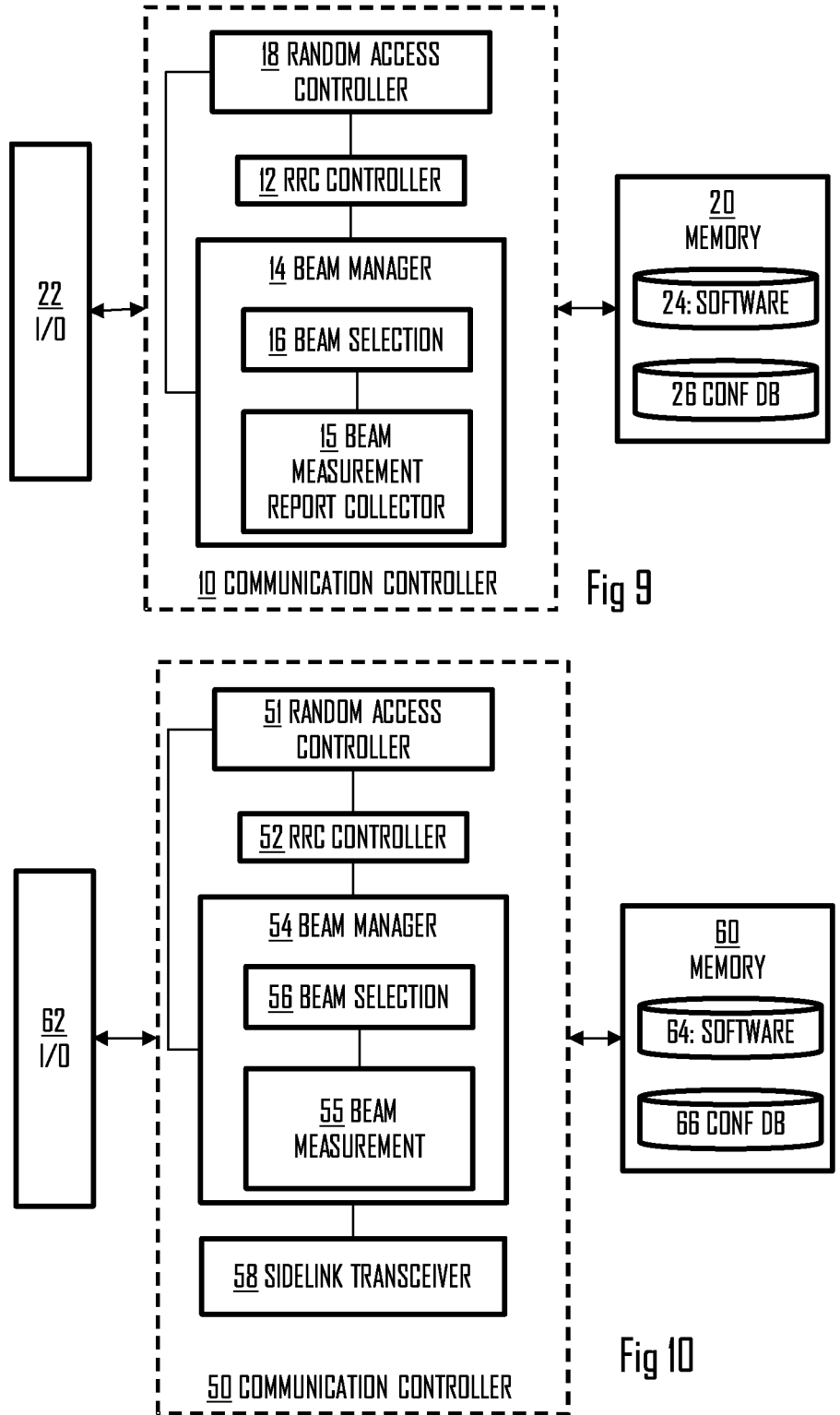
FIGS. 9 and 10 illustrate block diagrams of embodiments of apparatuses configured to carry out the respective processes of FIGS. 3 and 4.

FIG. 9 illustrates an apparatus comprising a processing circuitry, such as at least one processor, and at least one memory 20 including a computer program code (software) 24, wherein the at least one memory and the computer program code (software) are configured, with the at least one processor, to cause the apparatus to carry out the process of FIG. 3 or any one of its embodiments described above. The apparatus may be generally for the purpose of communication or wireless communication. The apparatus may be for the terminal device 100. The apparatus may be a circuitry or an electronic device realizing some embodiments of the invention in the terminal device 100. The apparatus carrying out the above-described functionalities may thus be comprised in such a device, e.g. the apparatus may comprise a circuitry such as a chip, a chipset, a processor, a micro controller, or a combination of such circuitries for the terminal device 100. The at least one processor or a processing circuitry may realize a communication controller 10 controlling communications with the cellular network infrastructure and over the sidelinks for the purpose of at least receiving beam measurement reports to facilitate the access to one or more access nodes. The communication controller may be configured to establish and manage radio connections and transfer of data over the radio connections.

The communication controller 10 may comprise a RRC controller 12 configured to manage RRC connections with the access node 104 and other access nodes of the cellular communication system. The RRC controller 12 may be configured to establish and manage the RRC connections for the purpose transfer of data over the RRC connections. More information on the details of the RRC connections and their operation for the purpose of data transfer can be found in the literature or 3GPP specifications. The communication controller 10 may further comprise a beam manager 14 configured to perform the beam selection according to the principles described above. The beam manager 14 may be controlled by the RRC controller, e.g. enabled upon determining to establish or re-establish a RRC connection with the access node 104. The beam manager 14 may comprise a beam measurement report collector 15 configured to monitor for sidelink communication resources and collect the beam measurement reports, as described above. The beam measurement report(s) received over the sidelink may then be output to a beam selection circuit 16 configured to perform the beam selection of block 302 or 800, for example. In some embodiments, the beam selection circuit 16 is configured to carry out the beam measurements and the selection according to block 402, e.g. if no beam measurement report is available. The communication controller 10 may further comprise a random access controller 18 configured to perform the above-described random access to the access node 104 in the random access resources of the selected beam.

The memory 20 may be implemented using any suitable data storage technology, such as semiconductor-based memory devices, flash memory, magnetic memory devices and systems, optical memory devices and systems, fixed memory and removable memory. The memory 20 may comprise a configuration database 26 for storing configuration parameters, e.g. the beam measurement reports. The memory 20 may further store a data buffer for data to be transmitted from the apparatus towards the access node in the RRC connection to be established with the access node.

The apparatus may further comprise a communication interface 22 comprising hardware and/or software for providing the apparatus with radio communication capability with one or more access nodes and with the other terminal devices, as described above. The communication interface 22 may include, for example, an antenna or an antenna array, one or more radio frequency filters, a power amplifier, and one or more frequency converters. The communication interface 22 may comprise hardware and software needed for realizing the radio communications over the radio interface, e.g. according to specifications of an LTE or 5G radio interface(s), including the sidelink interface. The actual sidelink protocol may follow any state-of-the-art protocol specified in the literature that is suitable for the purposes described above. PC5 interface is only one embodiment of the sidelink communication protocol.

FIG. 10 illustrates an apparatus comprising a processing circuitry, such as at least one processor, and at least one memory 60 including a computer program code (software) 64, wherein the at least one memory and the computer program code (software) are configured, with the at least one processor, to cause the apparatus to carry out the process of FIG. 4 or any one of its embodiments described above. The apparatus may be for the terminal device 101 or 102. The apparatus may be a circuitry or an electronic device realizing some embodiments of the invention in the terminal device 101 or 102. The apparatus carrying out the above-described functionalities may thus be comprised in such a device, e.g. the apparatus may comprise a circuitry such as a chip, a chipset, a processor, a micro controller, or a combination of such circuitries for the terminal device 101 or 102. The at least one processor or a processing circuitry may realize a communication controller 50 controlling communications with the cellular network infrastructure and over the sidelinks for the purpose of at least transmitting beam measurement reports to facilitate access of other terminal devices to one or more access nodes.

The communication controller 50 may comprise a RRC controller 52 configured to manage RRC connections with the access node 104 and other access nodes of the cellular communication system. The RRC controller 52 may be configured to establish and manage the RRC connections for the purpose transfer of data over the RRC connections. The communication controller 50 may further comprise a beam manager 54 configured to perform the beam selection according to the principles described above with respect to block 402. The beam manager 54 may be controlled by the RRC controller, e.g. enabled upon determining to establish, re-establish or resume a RRC connection with the access node 104 or even in an idle or inactive state for acquisition of the system information transmitted by the access node 104. The beam manager 54 may comprise a beam measurement circuit 55 configured to carry out the measurements of the beam grid transmitted by the access node in a beam sweeping manner, as described above. The beam measurement circuit 55 may compute the quality metric for each detected beam and output the quality metric(s) to a beam selection circuit 56 configured to carry out block 402 and select the beam with which to communicate with the access node. As described above, the beam selection may be performed during the RRC connection or for the purpose of establishing the RRC connection. The beam manager 54 may further generate the beam measurement report on the basis of the measurements and the beam selection and output the beam measurement report to a sidelink transceiver 58 for the transmission of the beam measurement report over the sidelink. The sidelink transceiver may then transmit the beam measurement report according to the procedure of FIG. 6, for example. The communication controller 50 may further comprise a random access controller 51 configured to perform the above-described random access to the access node 104 in the random access resources of the selected beam.

The memory 60 may be implemented using any suitable data storage technology, such as semiconductor-based memory devices, flash memory, magnetic memory devices and systems, optical memory devices and systems, fixed memory and removable memory. The memory 60 may comprise a configuration database 66 for storing configuration parameters, e.g. the beam measurement results. The memory 60 may further store a data buffer for data to be transmitted from the apparatus towards the access node in the RRC connection to be established with the access node.

The apparatus may further comprise a communication interface 62 comprising hardware and/or software for providing the apparatus with radio communication capability with one or more access nodes and with the other terminal devices, as described above. The communication interface 62 may include, for example, an antenna or an antenna array, one or more radio frequency filters, a power amplifier, and one or more frequency converters. The communication interface 62 may comprise hardware and software needed for realizing the radio communications over the radio interface, e.g. according to specifications of an LTE or 5G radio interface(s), including the sidelink interface. The actual sidelink protocol may follow any state-of-the-art protocol specified in the literature that is suitable for the purposes described above. PC5 interface is only one embodiment of the sidelink communication protocol.

The apparatuses of FIGS. 9 and 10 may further comprise an application processor (not shown) operating as a source and a sink for application data transferred over RRC connections. The application data may relate to a primary purpose of an apparatus comprising the terminal device. Such an apparatus may be a mobile phone, a tablet computer, a smart watch, or another personal communication device, or it may be a vehicle, a sensor device or another industrial device with cellular communication capability. Accordingly, the application data may comprise various data.

The apparatus of FIG. 9 and/or 10 may be implemented as an embedded apparatus or system. An embedded system may be seen as a computing system, such as a combination of a (general purpose or custom made) processor, computer memory and software, that has a dedicated function. In some implementations the system also comprises input/output devices, such as a radio transmitter/receiver, for example. Embedded systems range from portable devices, such as smart phones or watches, to large and complex systems like vehicles, medical systems and robotics.

Ubiquitous computing is a concept where computing can occur using any device, in any location, and in any format. The apparatus of FIG. 9 and/or 10 using ubiquitous computing may be implemented in many different forms, for instance as a computer and/or communication means in everyday objects such as a refrigerator or a pair of glasses. Ubiquitous computing devices may be, for example wearable devices (including fabrics), hand-held devices, interactive larger display devices, miniaturized micro electro-mechanical systems (MEMS), etc. The computing may be implemented as an embedded system or by using application software.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIG. 3, 4, or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising at least one processor and at least one memory including computer program code, wherein the at least one memory and computer program code are configured, with the at least one processor, to cause the apparatus to:

receive, directly from a terminal device over a sidelink between the apparatus and the terminal device, a beam measurement report, the beam measurement report indicating at least one beam of a plurality of directive beams transmitted by an access node;

use the beam measurement report to select a beam amongst the at least one beam;

select the beam in an idle or inactive state of the apparatus; and communicate with the access node in communication resources of the selected beam.

2. A method comprising:

receiving, by a first terminal device directly from a second terminal device over a sidelink between the first terminal device and the second terminal device, a beam measurement report, the beam measurement report indicating at least one beam of a plurality of directive beams transmitted by an access node;

using, by the first terminal device, the beam measurement report to select a beam amongst the at least one beam; and communicating, by the first terminal device, with the access node in communication resources of the selected beam, wherein the first terminal device selects the beam in an idle or inactive state of the first terminal device.

\* \* \* \* \*